(12) United States Patent
Huang et al.

(10) Patent No.: US 8,771,558 B2
(45) Date of Patent: Jul. 8, 2014

(54) METHOD OF MANUFACTURING ANTI-COUNTERFEIT INK AND ANTI-COUNTERFEIT TAG AND METHOD OF MANUFACTURING THE SAME

(75) Inventors: Borh-Ran Huang, Taipei (TW); Tzu-Ching Lin, Kaohsiung (TW); Ying-Kan Yang, Taichung County (TW)

(73) Assignee: National Taiwan University of Science and Technology, Taipei (TW)

( * ) Notice: Subject to any disclaimer, the term of this patent is extended or adjusted under 35 U.S.C. 154(b) by 720 days.

(21) Appl. No.: 12/963,640

(22) Filed: Dec. 9, 2010

(65) Prior Publication Data

US 2012/0061950 A1   Mar. 15, 2012

(30) Foreign Application Priority Data

Sep. 14, 2010   (TW) ................................ 99131054 A

(51) Int. Cl.
| | |
|---|---|
| *H01B 1/00* | (2006.01) |
| *H01B 1/02* | (2006.01) |
| *H01B 1/08* | (2006.01) |
| *H01B 1/12* | (2006.01) |
| *C09D 11/00* | (2014.01) |
| *B42D 15/00* | (2006.01) |

(52) U.S. Cl.
USPC ............... 252/520.5; 252/500; 252/518.1; 252/519.3; 252/519.33; 106/31.13; 106/31.64; 106/31.92; 283/83

(58) Field of Classification Search
USPC ........... 252/500, 518.1, 519.3, 519.33, 520.5; 106/31.13, 31.64, 31.92; 283/83
See application file for complete search history.

(56) References Cited

U.S. PATENT DOCUMENTS

| | | | |
|---|---|---|---|
| 6,849,109 B2 * | 2/2005 | Yadav et al. | ............... 106/31.13 |
| 2003/0082237 A1 * | 5/2003 | Cha et al. | ...................... 424/490 |
| 2008/0187651 A1 * | 8/2008 | Lee et al. | ......................... 427/77 |

OTHER PUBLICATIONS

Thomas et al. Atmospheric Pressure Plasma Treatment of Polymers: Relevance to Adhesion. Technology and Engineering. 2013.*

* cited by examiner

*Primary Examiner* — Harold Pyon
*Assistant Examiner* — Tanisha Diggs
(74) *Attorney, Agent, or Firm* — Jianq Chyun IP Office

(57) ABSTRACT

A method of manufacturing an anti-counterfeit ink is provided. A tungsten oxide nanowire is provided. A hydrophilic treatment is performed to the tungsten oxide nanowire to form a tungsten oxide nanowire with hydrophilicity. The tungsten oxide nanowire with hydrophilicity and an ink are mixed to form an anti-counterfeit ink.

7 Claims, 2 Drawing Sheets

METHOD OF MANUFACTURING ANTI-COUNTERFEIT INK AND ANTI-COUNTERFEIT TAG AND METHOD OF MANUFACTURING THE SAME

CROSS-REFERENCE TO RELATED APPLICATION

This application claims the priority benefit of Taiwan application serial no. 99131054, filed on Sep. 14, 2010. The entirety of the above-mentioned patent application is hereby incorporated by reference herein and made a part of specification.

BACKGROUND OF THE INVENTION

1. Field of the Invention

The invention relates to manufacturing methods of an ink and a tag, and more particularly to manufacturing methods of an anti-counterfeit ink and an anti-counterfeit tag.

2. Description of Related Art

With the establishment of free trade economics and the growth of intelligence transformation crimes over the globe, the intelligence anti-counterfeit ink technology is important for fighting against counterfeit products so as to regulate the market. Thus, the anti-counterfeit printing ink technology has more populated development and wider application scope. The beneficial results thereof are consequently more favorable.

Generally, the anti-counterfeit ink combines various scientific fields such as mechanics, thermology, optics, and chemistry to develop the intelligence composite anti-counterfeit ink technology. The conventional anti-counterfeit ink technology is categorized as follows. (1) Mechanical property: a mechanochromic material is added to an ink. The mechanochromic material has a structure of a capsule containing dyes inside. Therefore, an anti-counterfeit tag printed by the mixture of the ink and the mechanochromic material releases dyes when an external force is exerted (i.e. pressing by a finger) thereon, so that the color of the anti-counterfeit tag changes immediately. (2) Thermology property: a thermochromic material is added to an ink. When the environmental temperature changes, the ink having the thermochromic material then results in a color change to attain the anti-counterfeitation. (3) Optical property: taking a light emitting diode as an example, a photochromic material is added to an ink. When irradiated by the ultra-violet light, the ink having the photochromic material radiates visible light and generates a color change to attain the anti-counterfeitation. (4) Electricity property: an electrochromic material is added to an ink. When a voltage is applied to the ink having the electrochromic material, as the electrochromic material undergoes a color change, the ink also results in a color change so as to attain the anti-counterfeitation.

Although various anti-counterfeit inks and anti-counterfeit tags printed by anti-counterfeit inks have been disclosed, the demands for anti-counterfeit inks and anti-counterfeit tags increase tremendously. The development for anti-counterfeit inks and anti-counterfeit tags still needs to be researched actively.

SUMMARY OF THE INVENTION

The invention is directed to a manufacturing method of an anti-counterfeit ink and a manufacturing method of an anti-counterfeit tag. The anti-counterfeit ink and the anti-counterfeit tag are not easily affected by environmental factors and have superior anti-counterfeit ability.

The invention is directed to a manufacturing method of an anti-counterfeit ink. A tungsten oxide nanowire is provided. A hydrophilic treatment is performed to the tungsten oxide nanowire to form a tungsten oxide nanowire with hydrophilicity. The tungsten oxide nanowire with hydrophilicity is mixed with an ink to form an anti-counterfeit ink.

According to an embodiment of the invention, the tungsten oxide nanowire includes a tungsten trioxide nanowire.

According to an embodiment of the invention, the tungsten oxide nanowire is colorless or pale yellow.

According to an embodiment of the invention, the ink includes a black ink, a white ink, or a color ink.

According to an embodiment of the invention, the anti-counterfeit ink changes from a first color to a second color when a voltage is applied to the anti-counterfeit ink.

According to an embodiment of the invention, the first color includes black, red, green, and blue, and the second color includes blue-black, blue-purple, blue-green, and deep blue.

According to an embodiment of the invention, the voltage ranges from 1 V to 5 V.

According to an embodiment of the invention, the hydrophilic treatment includes an etching process.

According to an embodiment of the invention, the etching process includes a plasma etching process and a chemical etching process.

According to an embodiment of the invention, the plasma etching process includes using hydrogen plasma.

According to an embodiment of the invention, the chemical etching process includes using an acid solution.

According to an embodiment of the invention, the hydrophilic treatment further includes adding an interface dispersant.

According to an embodiment of the invention, the ink includes a conductive filler, a metal oxide, and a conductive polymer.

According to an embodiment of the invention, the conductive polymer includes polythiophene.

The invention is further directed to a manufacturing method of an anti-counterfeit tag. A substrate is provided. An anti-counterfeit ink aforementioned is printed on the substrate to form an anti-counterfeit tag, such that the anti-counterfeit tag changes from a first color to a second color when a voltage is applied to the anti-counterfeit tag.

According to an embodiment of the invention, the tungsten oxide nanowire includes a tungsten trioxide nanowire.

According to an embodiment of the invention, the tungsten oxide nanowire is colorless or pale yellow.

According to an embodiment of the invention, the first color includes black, red, green, and blue, and the second color includes blue-black, blue-purple, blue-green, and deep blue.

According to an embodiment of the invention, the voltage ranges from 1 V to 5 V.

According to an embodiment of the invention, the substrate includes a flexible substrate, a conductive substrate, a non-conductive substrate, and a water-proof substrate.

The invention is further directed to an anti-counterfeit tag. The anti-counterfeit tag is printed by a tungsten oxide nanowire with hydrophilicity, which is mixed in an ink. The anti-counterfeit tag changes from a first color to a second color when a voltage is applied to the anti-counterfeit tag.

According to an embodiment of the invention, the tungsten oxide nanowire with hydrophilicity includes a tungsten trioxide nanowire.

According to an embodiment of the invention, the tungsten oxide nanowire with hydrophilicity is colorless or pale yellow.

According to an embodiment of the invention, the first color includes black, red, green, and blue, and the second color includes blue-black, blue-purple, blue-green, and deep blue.

According to an embodiment of the invention, the voltage ranges from 1 V to 5 V.

In light of the foregoing, the manufacturing method of the anti-counterfeit ink in the invention includes performing the hydrophilic treatment to the tungsten oxide nanowire and mixing the tungsten oxide nanowire with the ink, such that the tungsten oxide nanowires can be evenly dispersed in the ink. As a result, the sensitivity of the anti-counterfeit ink and the anti-counterfeit tag printed by the anti-counterfeit ink can be greatly enhanced for detecting counterfeits effectively.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
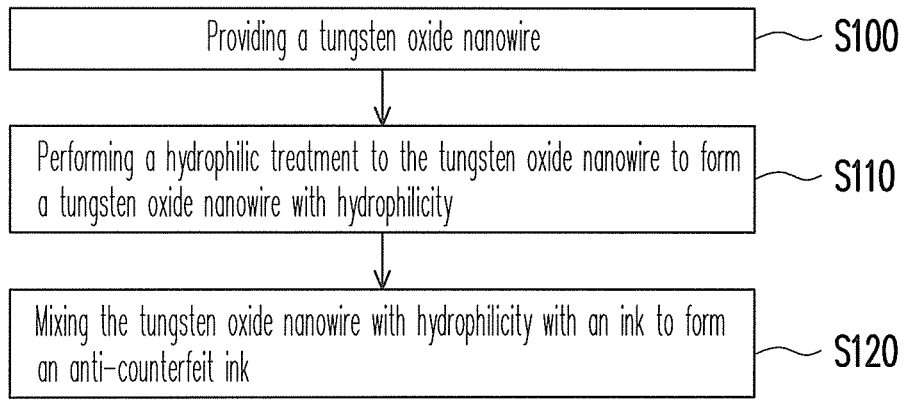
FIG. 1 illustrates a manufacturing method of an anti-counterfeit ink according to one embodiment of the invention.

FIG. 1 illustrates a manufacturing method of an anti-counterfeit ink according to one embodiment of the invention. Referring to FIG. 1, step S100 is performed, where a tungsten oxide nanowire is provided. In the present embodiment, the tungsten oxide nanowire includes, for example, a tungsten trioxide ($WO_3$) nanowire, a tungsten oxide ($W_{18}O_{49}$) nanowire, a tungsten oxide ($WO_{3-x}$) nanowire. Here, the tungsten oxide nanowire is preferably the tungsten trioxide nanowire. In general, the tungsten oxide nanowire has the electrochromic property and changes from colorless or pale yellow to blue or deep blue after a voltage is applied thereto. The tungsten oxide nanowire is formed by a vapor-solid (VS) method, an electrochemical deposition method, a hydrothermal method, an anode aluminum oxide (AAO) method, or a sol-gel method. For instance, in the VS method, a pure tungsten film is formed using a method such as a chemical vapor deposition method and the like. The pure tungsten film is then self-catalyzed to synthesize a tungsten oxide nanowire. That is, tungsten plays the role of a self-catalyzing agent in the process, so that the surface of the pure tungsten film react with the oxygen in the furnace to form the tungsten oxide nanowire under high temperature. A reaction temperature of the surface of the pure tungsten film and oxygen is about 700° C., for example. In order to obtain a higher ratio of tungsten trioxide nanowire, a systemic pressure is maintained at about 50 torr, for example. A diameter of the tungsten oxide nanowire is, for instance, about 30 nm. A length of the tungsten oxide nanowire is about 350 nm, for example. Notably, since the tungsten oxide nanowire has a larger contact area comparing to a tungsten oxide film, the tungsten oxide nanowire is expected to have a faster electrochromic reaction speed.

Next, step S110 is performed, where a hydrophilic treatment is performed to the tungsten oxide nanowire to form a tungsten oxide nanowire with hydrophilicity. The hydrophilic treatment includes an etching process such as a plasma etching process, a chemical etching process, or other etching processes. In the present embodiment, the plasma etching process includes using hydrogen plasma, and the chemical etching process includes performing at least one of an acid purification treatment and an acid oxidation treatment. In the acid purification treatment, the tungsten oxide nanowire is placed in a mixture solution of hydrochloric acid and nitric acid (the volume ratio of hydrochloric acid and nitric acid is 3:1) to undergo the acid etching. The acid purification treatment takes 1 to 24 hours and the treatment temperature ranges from 70° C. to 110° C. In the acid oxidation treatment, the tungsten oxide nanowire is placed in a mixture solution of sulfuric acid and nitric acid (the volume ratio of sulfuric acid and nitric acid is 3:1) to undergo the acid oxidation. The acid oxidation treatment takes 1 to 24 hours and the treatment temperature ranges from 70° C. to 110° C. In addition, in one embodiment, the hydrophilic treatment further includes the following. After the etching process is performed to the tungsten oxide nanowire, a tungsten oxide nanowire with hydrophilicity is mixed with an interface dispersant, so that the tungsten oxide nanowires are dispersed in the solution evenly and permanently. Commonly, the tungsten oxide nanowire is a hydrophobic material and thus can not be mixed evenly in a liquid such as an ink. Although an interface dispersant can be added for the tungsten oxide nanowire to mix into the liquid temporarily, the effect thereof is still unfavorable. However, in the present embodiment, the hydrophilic treatment in step S110 modifies the tungsten oxide nanowire with hydrophobicity into the tungsten oxide nanowire with hydrophilicity, so that the tungsten oxide nanowires are dispersed evenly in the liquid. In particular, as the hydrophilic treatment increases micro-pore structures in the tungsten oxide nanowire and therefore increases the bonding between tungsten and oxygen on the surface, the photoelectric property of the tungsten oxide nanowire is enhanced as a consequence. As shown from experiments, the hydrophilicity treatment enhances the photoelectric property of the tungsten oxide nanowire and does not change the main crystal orientation of the nanowire.

Thereafter, step S120 is performed, where the tungsten oxide nanowire with hydrophilicity is mixed with an ink to form an anti-counterfeit ink. In the present embodiment, the ink is a water-based ink or an oil-based ink. Moreover, the ink is a black ink, a white ink, or a color ink. As the tungsten oxide nanowire is, for example, colorless or pale yellow, the anti-counterfeit ink can be black, red, green, blue, or other colors. In the present embodiment, the ink is a conductive ink including a conductive filler, a metal oxide, and a conductive polymer. In another embodiment, a tungsten oxide nanowire with hydrophilicity, a non-conductive ink, and a conductive polymer are mixed, such that the anti-counterfeit ink has better conductivity. A molecular weight of the conductive polymer ranges from 7784 g/mol to 26671 g/mol, for instance. The conductive polymer is polythiophene, for example. It should be noted that since the conductive ink has properties such as superior conductivity, low resistance, low chance of oxidizing, stable performance, high adhesion, high masking power, and so on, when the conductive ink and the tungsten oxide nanowire having the electrochromic property are mixed to form the anti-counterfeit ink, this anti-counterfeit ink has better electrochromic response.

Since the tungsten oxide nanowire has the electrochromic property and changes from colorless or pale yellow to blue or deep blue after a voltage is applied, and the tungsten oxide nanowire with hydrophilicity and the ink are mixed evenly into the anti-counterfeit ink, the tungsten oxide nanowire in the anti-counterfeit ink undergoes a chemical reaction as shown in Formula 1 in electrolytes when a voltage is applied to the anti-counterfeit ink.

$$WO_3 + xM^+ + xe^- \Leftrightarrow M_xWO_3 \quad \text{(Formula 1)}$$

Herein, $M^+$ is a monovalent cation such as $H^+$, $Li^+$, or $Na^+$ provided by solid or liquid electrolytes, for example. $M_xWO_3$ is referred as tungsten bronze, where x ranges from 0 to 0.5 and is determined by a current passing into the anti-counterfeit ink. In details, the current passing into the anti-counterfeit ink allows the tungsten oxide ($WO_3$) nanowire to undergo a reduction reaction. Herein, $M^+$ and $e^-$ enter the tungsten oxide nanowire at the same time so as to form tungsten bronze ($M_xWO_3$) with a color of bronze or deep blue. This is referred as a coloration reaction. In a decoloration reaction, $M^+$ and $e^-$ exit tungsten bronze ($M_xWO_3$) at the same time so as to form the colorless tungsten oxide ($WO_3$) nanowire. Generally, the degree of discoloration of the tungsten oxide nanowire and the intensity of the voltage are positively correlated. However, the voltage ranges from 1 V to 5 V, for example, for detecting counterfeits.

In the present embodiment, when a voltage is applied to the anti-counterfeit ink, the tungsten oxide nanowire in the anti-counterfeit ink undergoes the chemical reaction as shown in Formula 1, so that the anti-counterfeit ink changes from the first color to the second color. Here, the first color is a color that shows after the tungsten oxide nanowire and the ink are mixed. The tungsten oxide nanowire is, for instance, colorless or pale yellow. The ink is colorless, white, black, or colored. Thus, the first color is black, red, green, blue or other colors, for example. The second color is a color shown by both of the tungsten oxide nanowire and the ink after the discoloration. Corresponding to the first color aforementioned, the second color is blue-black, blue-purple, blue-green, deep blue, or other colors, respectively. It should be illustrated that as the tungsten oxide nanowire is made of a transparent material or a pale yellow material, the ink does not have color difference or merely has insignificant color difference when the tungsten oxide nanowire is added. Thus, when undergoing the electrochromism, the tungsten oxide nanowire changes from colorless or pale yellow to blue or deep blue. The change of the anti-counterfeit ink can thus be detected easily by naked eyes or instruments.

In the present embodiment, the hydrophilic treatment is performed to the tungsten oxide nanowire having the electrochromic property so as to modify the tungsten oxide nanowire with hydrophobicity into the tungsten oxide nanowire with hydrophilicity. The tungsten oxide nanowire with hydrophilicity is mixed with the ink, so that the tungsten oxide nanowires are evenly dispersed in the ink for forming the anti-counterfeit ink. As the tungsten oxide nanowire with nanowire scale has larger contact area and the hydrophilic treatment further increases micro-pore structures in the tungsten oxide nanowire, the tungsten oxide nanowires are dispersed evenly in the ink so as to greatly enhance the sensitivity of the electrochromic property of the anti-counterfeit ink. In other words, when a voltage is applied to the anti-counterfeit ink, the color change of the anti-counterfeit ink can be easily examines or detected, such that counterfeits can be detected effectively. In particular, as the examination is performed by applying a voltage to the anti-counterfeit ink, the examination is not easily affected by environmental factors such as temperature and counterfeits can be detected more effectively. Therefore, the anti-counterfeit ink of the present embodiment can be widely applied in various fields for printing words or tags with anti-counterfeiting use. The market can be regulated as a consequence and more benefits may result.

Figure 2:
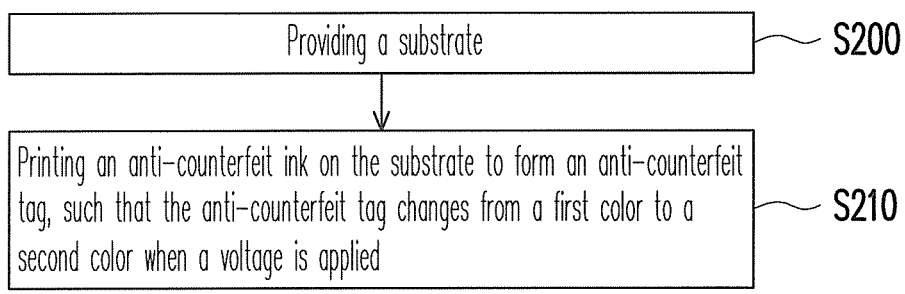
FIG. 2 illustrates a manufacturing method of an anti-counterfeit tag according to one embodiment of the invention.
Figure 3:
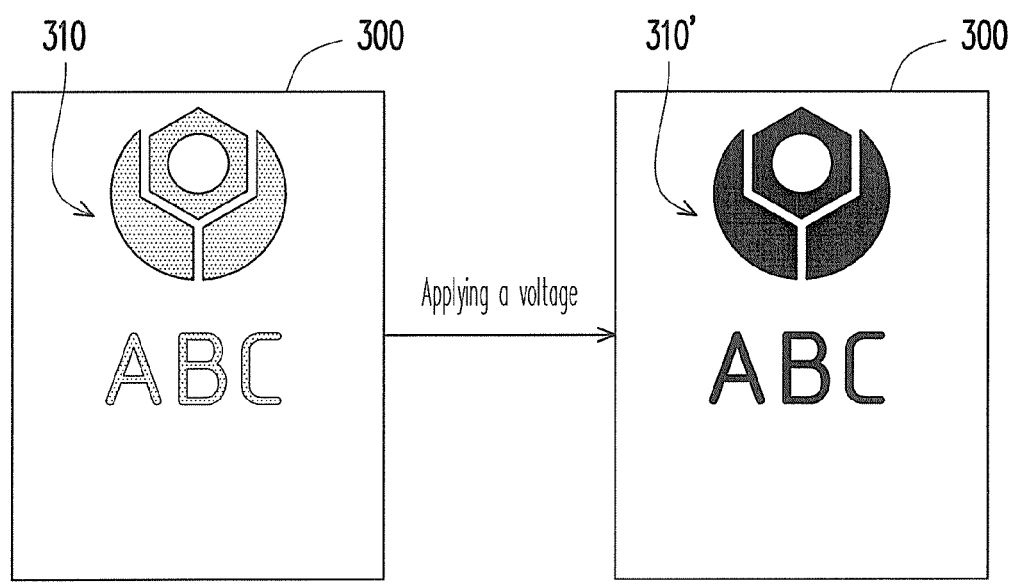
FIG. 3 shows a schematic diagram of an anti-counterfeit tag before and after a voltage is applied thereon according to one embodiment of the invention.

FIG. 2 illustrates a manufacturing method of an anti-counterfeit tag according to one embodiment of the invention. FIG. 3 shows a schematic diagram of an anti-counterfeit tag before and after a voltage is applied according to one embodiment of the invention. Referring to FIGS. 2 and 3 simultaneously, step S200 is performed, where a substrate 300 is provided. The substrate 300 is a conductive substrate, a non-conductive substrate, a flexible substrate, a water-proof substrate or a substrate of other types. The substrate 300 is, for example, a piece of paper, a glass substrate, a plastic substrate, a substrate of other types, or a material suitable for printing the anti-counterfeit ink. Notably, in one embodiment, as the conductive substrate provides electrons, the anti-counterfeit tag has a better electrochromic response. Thus, when the anti-counterfeit ink is a non-conductive ink, a conductive substrate can be used. On the other hand, when the anti-counterfeit ink is a conductive ink, a non-conductive substrate or a conductive substrate can be applied.

Afterwards, step S210 is carried out, where an anti-counterfeit ink aforementioned is printed on the substrate 300 to form an anti-counterfeit tag 310, such that the anti-counterfeit tag 310 changes from a first color into a second color when a voltage is applied to the anti-counterfeit tag 310. The anti-counterfeit tag 310 can be words, stamps, or patterns, for example. In the present embodiment, the anti-counterfeit tag 310 is used in documentary data, for instance. That is, the anti-counterfeit ink is printed on the substrate 300 such as paper. Here, the method of printing is a spray printing method or other suitable methods. Obviously, in other embodiments, the anti-counterfeit tag 310 can also be printed on various products, especially on objects that need to be secured and anti-counterfeited such as bills, postage stamps, emblems, and identification cards for the purpose of anti-counterfeitation.

Referring to FIG. 3, in the present embodiment, a first color is an original color of an anti-counterfeit tag 310 (i.e. the anti-counterfeit tag 310 shown on the left side of a piece of paper in FIG. 3). That is, the first color is a color of an anti-counterfeit ink mixed by a tungsten oxide nanowire and an ink, such as black, red, green, and blue. A second color is a color of an anti-counterfeit tag 310' (i.e. the anti-counterfeit tag 310' shown on the right side of the paper in FIG. 3) after undergoing a discoloration reaction shown in Formula 1 when a voltage is applied. In other words, the second color is a color presented by the tungsten oxide nanowire and the ink after the discoloration. The second color is blue-black, blue-purple, blue-green, deep blue, or other colors corresponding to the first color, respectively. Generally, the degree of discoloration of the tungsten oxide nanowire and the intensity of the voltage are positively correlated. However, the voltage ranges from 1 V to 5 V, for example, for the purpose of detecting counterfeits.

In one embodiment, the electrochromic reaction test of the anti-counterfeit tag 310 is performed, for instance, in solid or liquid electrolytes capable of providing monovalent cations, which facilitate the chemical reaction as shown in Formula 1. Notably, when the anti-counterfeit ink is a conductive ink, electrons are provided without the assistance of a conductive substrate, so that the anti-counterfeit tag 310 having the electrochromic property has a color change. On the other hand, when the anti-counterfeit ink is a non-conductive ink, a conductive substrate is preferably adopted to provide electrons so as to increase the electrochromic reaction speed of the anti-counterfeit tag 310. Additionally, as the tungsten oxide nanowire is made of a transparent material or a pale yellow material, the ink does not have color difference or merely has insignificant color difference when the tungsten oxide nanowire is added. Thus, when undergoing the electrochromism, the tungsten oxide nanowire changes from colorless or pale yellow to blue or deep blue. The change of the anti-counterfeit ink 310 can thus be detected easily by naked eyes or instruments.

Especially, the anti-counterfeit tag in the invention can be applied in objects that need to be secured and anti-counterfeited such as bills, postage stamps, emblems, and identification cards. The color change of the anti-counterfeit tag can be easily detected by merely applying a small voltage to the anti-counterfeit tag. With the establishment of free trade economics and the growth of intelligence transformation crimes, the anti-counterfeit tag of the invention is important for fighting against counterfeit products so as to regulate the market. Consequently, the anti-counterfeit tag of the invention can be manufactured over the world for standardization.

In summary, the manufacturing method of the anti-counterfeit ink in the invention includes the following. The hydrophilic treatment is performed to the tungsten oxide nanowire having the electrochromic property so as to modify the tungsten oxide nanowire with hydrophobicity into the tungsten oxide nanowire with hydrophilicity. The tungsten oxide nanowire with hydrophilicity is mixed with the ink, so that the tungsten oxide nanowires are evenly dispersed in the ink for forming the anti-counterfeit ink Hence, as the tungsten oxide nanowire with nanowire scale has larger contact area and the hydrophilic treatment further increases micro-pore structures in the tungsten oxide nanowire, the tungsten oxide nanowires are dispersed evenly in the ink so as to greatly enhance the sensitivity of the electrochromic property of the anti-counterfeit ink. In other words, when a voltage is applied to the anti-counterfeit ink and the anti-counterfeit tag printed by the anti-counterfeit ink, the color change of the anti-counterfeit ink and the anti-counterfeit tag can be detected or examined easily, such that counterfeits can be effectively detected. In particular, as the examination of the anti-counterfeit ink and the anti-counterfeit tag is performed by applying a voltage thereto, the examination is not easily affected by environmental factors such as temperature and counterfeits can be detected more effectively. Therefore, the anti-counterfeit ink and the anti-counterfeit tag of the invention can be widely applied in various fields, and are important for regulating the market and fighting against counterfeit products, so as to bring great beneficial results.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A manufacturing method of an anti-counterfeit ink, the method comprising:
   providing a tungsten oxide nanowire;
   performing a hydrophilic treatment to the tungsten oxide nanowire to form a tungsten oxide nanowire with hydrophilicity, wherein the hydrophilic treatment is a plasma etching process using hydrogen plasma or a chemical etching process; and
   mixing the tungsten oxide nanowire with hydrophilicity with an ink to form an anti-counterfeit ink.

2. The manufacturing method of the anti-counterfeit ink as claimed in claim 1, wherein the tungsten oxide nanowire comprises a tungsten trioxide nanowire.

3. The manufacturing method of the anti-counterfeit ink as claimed in claim 1, when a voltage is applied to the anti-counterfeit ink, the anti-counterfeit ink changes from a first color to a second color.

4. The manufacturing method of the anti-counterfeit ink as claimed in claim 1, wherein the ink comprises a conductive filler, a metal oxide, and a conductive polymer.

5. A manufacturing method of an anti-counterfeit tag, the method comprising:
   providing a substrate; and
   printing an anti-counterfeit ink as claimed in claim 1 on the substrate to form the anti-counterfeit tag, such that the anti-counterfeit tag changes from a first color to a second color when a voltage is applied to the anti-counterfeit tag.

6. The manufacturing method of the anti-counterfeit tag as claimed in claim 5, wherein the tungsten oxide nanowire comprises a tungsten trioxide nanowire.

7. The manufacturing method of the anti-counterfeit tag as claimed in claim 5, wherein the substrate comprises a flexible substrate, a conductive substrate, a non-conductive substrate, and a water-proof substrate.

* * * * *